(12) United States Patent
Fot (10) Patent No.: US 9,964,075 B2
(45) Date of Patent: May 8, 2018

(54) EXHAUST-GAS HEAT EXCHANGER WITH BYPASS PIPE

(71) Applicant: Benteler Automobiltechnik GmbH, Paderborn (DE)

(72) Inventor: Viktor Fot, Willebadessen (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 140 days.

(21) Appl. No.: 14/705,670

(22) Filed: May 6, 2015

(65) Prior Publication Data

US 2015/0322899 A1 Nov. 12, 2015

(30) Foreign Application Priority Data

May 7, 2014 (DE) .................. 10 2014 106 386

(51) Int. Cl.
| | |
|---|---|
| *F28F 27/02* | (2006.01) |
| *F02M 25/07* | (2006.01) |
| *F01N 3/04* | (2006.01) |
| *F02D 9/04* | (2006.01) |
| *F02D 9/10* | (2006.01) |
| *F16K 11/052* | (2006.01) |
| *F28D 7/02* | (2006.01) |
| *F28D 7/10* | (2006.01) |
| *F28D 21/00* | (2006.01) |
| *F02M 26/32* | (2016.01) |

(52) U.S. Cl.
CPC ......... *F02M 25/0737* (2013.01); *F01N 3/043* (2013.01); *F02D 9/04* (2013.01); *F02D 9/101* (2013.01); *F02D 9/1055* (2013.01); *F02D 9/1095* (2013.01); *F02M 26/32* (2016.02); *F16K 11/052* (2013.01); *F28D 7/024* (2013.01); *F28D 7/10* (2013.01); *F28D 21/0003* (2013.01); *F28F 27/02* (2013.01); *F01N 2240/02* (2013.01);

(Continued)

(58) Field of Classification Search
CPC . F01N 2240/02; F01N 2410/00; F02M 26/25; F02M 26/26; F02M 26/70; F28F 27/02; F28F 2250/06
USPC .................................................. 165/103, 297
See application file for complete search history.

(56) References Cited

U.S. PATENT DOCUMENTS 3,501,128 A * 3/1970 Pool ...................... F16K 5/0689
251/175
3,664,706 A 5/1972 Chant
(Continued)

FOREIGN PATENT DOCUMENTS

| | | | |
|---|---|---|---|
| DE | 2126846 A1 | 12/1971 | |
| DE | 10309298 | * 8/2004 | |

(Continued)

OTHER PUBLICATIONS

Murata, JP2008069750MT (English Translation), Mar. 2008.*
Bretag, DE10309298MT (English Translation), Aug. 2004.*

*Primary Examiner* — Len Tran
*Assistant Examiner* — Eric Ruppert
(74) *Attorney, Agent, or Firm* — Hauptman Ham, LLP (57) ABSTRACT

The present invention relates to an exhaust-gas heat exchanger for a motor vehicle, having an encircling heat exchanger duct with a bypass pipe situated at the inside, a control flap being provided for conducting an exhaust-gas flow through the heat exchanger duct or through the bypass pipe, said exhaust-gas heat exchanger being characterized in that the control flap has an opening with a pipe stub-like section, the pipe stub-like section being in flow-conducting contact with an inlet opening of the bypass pipe in a bypass position, and the control flap being rotatable from a bypass position into a transfer position, in which the inlet is closed.

7 Claims, 6 Drawing Sheets

(52) U.S. Cl.
CPC ...... *F01N 2240/36* (2013.01); *F01N 2410/00* (2013.01); *F01N 2470/24* (2013.01); *F28D 2021/008* (2013.01); *F28F 2250/06* (2013.01); *F28F 2265/02* (2013.01); *Y02T 10/16* (2013.01); *Y02T 10/20* (2013.01)

(56) References Cited

U.S. PATENT DOCUMENTS

| | | | |
|---|---|---|---|
| 4,800,726 A | 1/1989 | Okada et al. | |
| 2005/0133202 A1* | 6/2005 | Jorgensen | F28D 7/024 165/103 |
| 2005/0220679 A1* | 10/2005 | Choi | B01D 53/9454 422/177 |

FOREIGN PATENT DOCUMENTS

| | | |
|---|---|---|
| EP | 0272680 A2 | 6/1988 |
| EP | 1455079 B1 | 3/2009 |
| EP | 2693011 A1 | 2/2014 |
| FR | 2891589 A1 | 4/2007 |
| JP | SHO63-198411 U | 12/1988 |
| JP | H-07103340 A | 4/1995 |
| JP | 2008069750 * | 3/2008 |
| JP | 2011214537 A | 10/2011 |

\* cited by examiner

EXHAUST-GAS HEAT EXCHANGER WITH BYPASS PIPE

CROSS-REFERENCE TO RELATED APPLICATIONS

This application claims the benefit of German Application No. 102014106386.4, filed May 7, 2014, which is incorporated herein by reference in its entirety.

The present invention relates to an exhaust-gas heat exchanger for a motor vehicle, as per the features in the preamble of patent claim 1.

In motor vehicles, internal combustion engines are used to convert the chemical energy contained in the fuel into mechanical energy by way of the combustion process. Here, efficiency is limited to approximately 40%. This means that, of the chemical energy contained in the fuel, 40% can be converted into mechanical energy, and from the remaining fraction of the energy, heat is produced which is then dissipated with the exhaust-gas flow or else is correspondingly released in the form of heat to the surroundings via the engine block or other peripheral components.

For various applications, it is advantageous to utilize the heat energy contained in the exhaust gas. For this purpose, exhaust-gas heat exchangers are known, through one side of which the exhaust-gas flow is conducted for the extraction, of heat, and a second duct is provided which, by way of a corresponding medium, then supplies the extracted heat for further use. This may for example be the heating of a passenger compartment, the heating of other engine components or else the supply of heat to a heat-dependent cycle process being made possible.

When an internal combustion engine is started, however, it is initially at ambient temperature which, depending on the field of use and climatic conditions, may generally lie between −20° C. and +40° C. The internal combustion engine is then in the cold-start phase, wherein here, the operating fluids, for example cooling water or other media such as, for example, the engine oil, are likewise in a cold state, and thus exhibit low flowability. It is then the aim to attain the optimum operating temperature of the internal combustion engine itself, and of all peripheral components, as quickly as possible.

Exhaust-gas aftertreatment components are arranged in particular in the region of the exhaust tract, said exhaust-gas aftertreatment components being correspondingly configured in terms of their efficiency for the optimum operating temperature. In the case of an exhaust-gas heat exchanger, it is thus normally the case that a bypass is provided, such that, for example, the exhaust-gas flow is initially conducted entirely through the bypass, and the exhaust-gas aftertreatment components correspondingly heat up more quickly, wherein during later operation, the exhaust-gas heat exchanger is then correspondingly placed into a transfer position, such that heat is extracted from the exhaust-gas flow.

An exhaust-gas heat exchanger of said type is known for example from EP 1 455 079 B1. In order that the exhaust-gas flow is conducted not through the transfer duct but through the bypass duct, or vice versa, a control element, in this case in the form of a spherical body, is known, which control element, by performing a rotational movement, correspondingly diverts the exhaust-gas flow through the bypass duct or through the transfer duct.

Furthermore, DE 21 26 846 A has disclosed a diversion valve for tipper vehicles with heated tipper bodies, wherein a control flap is used for switching over an exhaust-gas flow.

Various flap arrangements are also known from the prior art.

It is a problem here that, in particular in the case of Otto-cycle engines, temperatures of up to greater than 1000° C. prevail in the direct exhaust-gas flow, which leads to not inconsiderable thermal expansions and thermal loading, and that the exhaust gas exhibits highly corrosive properties, to which exhaust-gas components in the direct exhaust-gas flow are exposed.

It is therefore an object of the present invention to specify a control element in an exhaust-gas heat exchanger, which control element serves for the control of different ducts and is of a structurally simple design, is inexpensive to produce and is designed so as not to be sensitive to different thermal expansions.

The above-stated object is achieved according to the invention by means of an exhaust-gas heat exchanger according to the features in patent claim 1.

The dependent patent claims relate to advantageous design variants of the present invention.

The exhaust-gas heat exchanger according to the invention for a motor vehicle has a heat exchanger duct with a bypass pipe situated at the inside, wherein a control flap is provided for conducting an exhaust-gas flow through the heat exchanger duct or through the bypass pipe. According to the invention, the exhaust-gas heat exchanger is characterized in that the control flap has an opening with a pipe stub-like section, the pipe stub-like section being in flow-conducting contact with an inlet of the bypass pipe in a bypass position, and the control flap being rotatable from a bypass position into a transfer position, in which the inlet of the bypass pipe is closed.

The exhaust-gas heat exchanger is designed in particular as a heat exchanger which has a bypass pipe extending centrally in the longitudinal direction, such that the exhaust gas passing from an exhaust pipe can be conducted directly through the bypass pipe. Around the bypass pipe there is then situated a throughflow duct in the form of a transfer duct. If the exhaust gas is conducted not through the bypass pipe but through the transfer duct, there is also formed in the transfer duct itself a corresponding further duct for then extracting heat from the exhaust gas by way of a further medium. For example, said further duct may be coiled in the form of a spiral around the bypass pipe, such that then, the exhaust gas in the transfer duct flows over the individual lines of the spiral in a cross-current configuration.

To now selectively switch between a bypass position or a transfer position, a control flap according to the invention is provided, which is in particular in the form of a one piece and materially integral cast component. The control flap may, on the one hand, be operated such that only the transfer position or the bypass position is assumed. In the context of the invention, it would also be conceivable for a corresponding intermediate position to be assumed in order for part of the exhaust gas to be conducted through the transfer duct and the remaining part to be conducted through the corresponding bypass. The control flap can be moved from the transfer position into the bypass position by way of a rotational movement about a rotary spindle within an inlet region or entry region of the exhaust-gas heat exchanger. The flap is in particular of disk-shaped form, wherein an encircling disk body has an opening arranged in particular substantially centrally. Thus, in the bypass position, the disk body closes the path for the exhaust gas through the transfer duct, and the exhaust gas can flow through the opening directly into the bypass pipe.

It is now preferably the case that the control flap is mounted so as to be rotatable about a rotary spindle, wherein the rotary spindle is situated in particular in the region of the opening, and the opening itself is extended through. If the control flap is now rotated about the rotary spindle, the encircling disk body is rotated from an orthogonal position into a position lying in the exhaust-gas flow direction, such that the exhaust-gas flow can pass through the transfer duct.

In order that the disk body can now be pivoted over the bypass pipe or the inlet region of the bypass pipe, and jamming or form-fitting abutting contact does not occur here, it is furthermore provided that an arching in the form of a cowl is formed in the encircling disk body. The cowl of the encircling disk body then engages over the bypass pipe in the transfer position, wherein the cowl substantially corresponds to the external contour of the bypass pipe and, in the transfer position, comes to bear in form-fitting fashion against an outer shell surface of the inlet region of the bypass pipe.

In order that the bypass pipe is now likewise closed off in the transfer position, it is furthermore provided that a sealing plate is formed in the control flap, wherein, in the transfer position, the sealing plate bears in form-fitting fashion against the inlet of the bypass pipe and seals off said inlet. Here, the sealing plate is preferably formed, as it were, on the outer surface of the pipe stub-like section, such that here, an optimization of installation space is realized with regard to compact dimensions of the control flap as it performs the rotational movement about the rotary spindle.

In order that not only form-fitting abutting contact but also a sealing function is now provided here, it is furthermore the case that the inlet of the bypass pipe is flared or widened in an outward direction, in particular in relation to its radial direction. It is then the case that corresponding sealing elements, sealing bodies or sealing beads come to bear against an inner shell surface of the flared portion both in the transfer position of the sealing plate or in the bypass position of the pipe stub-like section. The sealing elements and/or sealing bodies and/or sealing beads are preferably formed on the control flap.

In order that it is now possible for the rotational movement to be performed within an inlet region of the exhaust-gas heat exchanger, in particular taking into consideration the cowl, a bulge is provided on an outer housing of the exhaust-gas heat exchanger. The bulge is in particular directed outward in the radial direction. The control flap and in particular the cowl can thus be pivoted past an inner side of the bulge without coming into form-fitting abutting contact therewith. In the bypass position, an outwardly encircling edge of the disk body comes to bear sealingly against an inner shell surface of the housing. In particular, the edge running around the outside then also extends in the region of the cowl, and here, too, comes to bear sealingly against the inner shell surface of the housing.

Further advantages, features, characteristics and aspects of the present invention will be discussed in the following description. Preferred design variants are illustrated in the schematic figures. The figures serve for ease of understanding of the invention. In the figures.

In the figures, the same reference signs are used for identical or similar components, even if, for simplicity, a repeated description is dispensed with.

Figure 1:
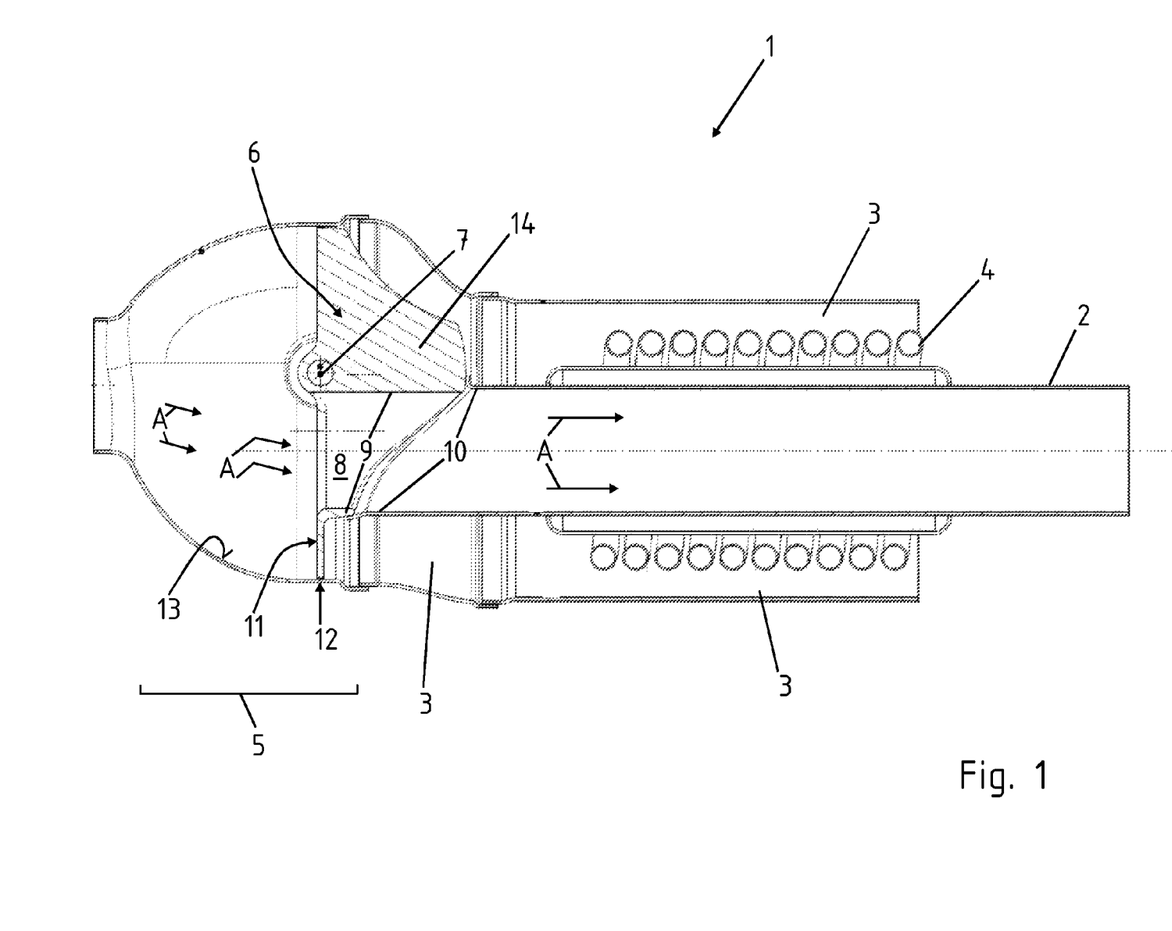
FIGS. 1 to 4 show a first design variant of the exhaust-gas heat exchanger according to the invention with bypass flap, in different views.

FIG. 1 shows an exhaust-gas heat exchanger 1 according to the invention, having a bypass pipe 2 situated at the inside and having a heat exchanger duct 3 which engages around the outside of the bypass pipe 2. In the heat exchanger duct 3, a spiral pipe 4 is arranged so as to be coiled around the bypass pipe 2, through which spiral pipe 4 it is then possible for a medium (not illustrated in any more detail) to be conducted, which medium, as per FIG. 2, extracts heat from the exhaust gas A flowing through the heat exchanger duct 3. In FIG. 1, however, the exhaust gas A flows entirely through the bypass pipe 2, because a control flap 6 is arranged in an inlet region 5 of the exhaust-gas heat exchanger 1 so as to be rotatable about a rotary spindle 7. The control flap 6 has an opening 8, wherein, from the opening 8, there extends a pipe stub-like section 9 which comes to bear in form-fitting fashion against an inlet 10 of the bypass pipe 2. The inlet 10 of the bypass pipe 2 is in this case flared outwardly in relation to its radial direction. The inlet 10 furthermore runs in an inclined manner in the axial direction of the bypass pipe 2 in order to permit a rotational movement of the control flap 6. In FIG. 1, the control flap 6 is situated in the bypass position, such that the exhaust gas A passing from an exhaust tract (not illustrated in any more detail) is impeded by the control flap 6 at the inlet 10 into the heat exchanger duct 3, and flows exclusively through the bypass pipe 2. This is realized by virtue of the fact that the control flap 6 has a disk body 11 running around the outside, wherein an encircling edge 12 of the disk body 11 comes to bear sealingly in form-fitting fashion against an inner side 13 of the inlet region 5. On an outer side of the pipe stub-like section 9 there is formed a cowl 14. In this design variant, the cowl 14 is of solid form.

Figure 2:
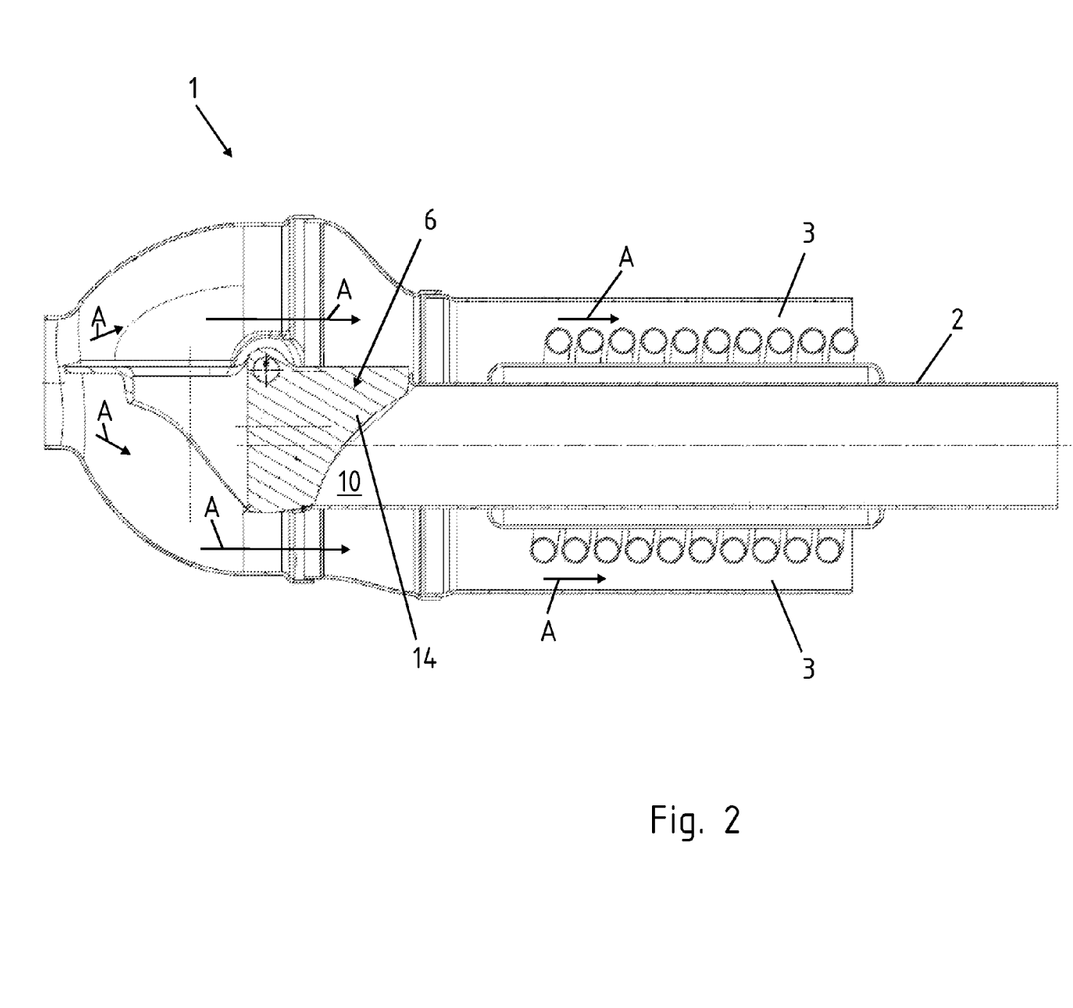

In FIG. 2, the control flap 6 has been moved into the transfer position, such that the exhaust gas A flows through the heat exchanger duct 3. The inlet 10 of the bypass pipe 2 is closed by the cowl 14 itself, such that here, it is in turn is not possible for exhaust gas to flow through the bypass pipe 2. Here, the cowl 14 comes to bear sealingly in form-fitting fashion against the outwardly flared inlet 10 of the bypass pipe 2.

Figure 3:
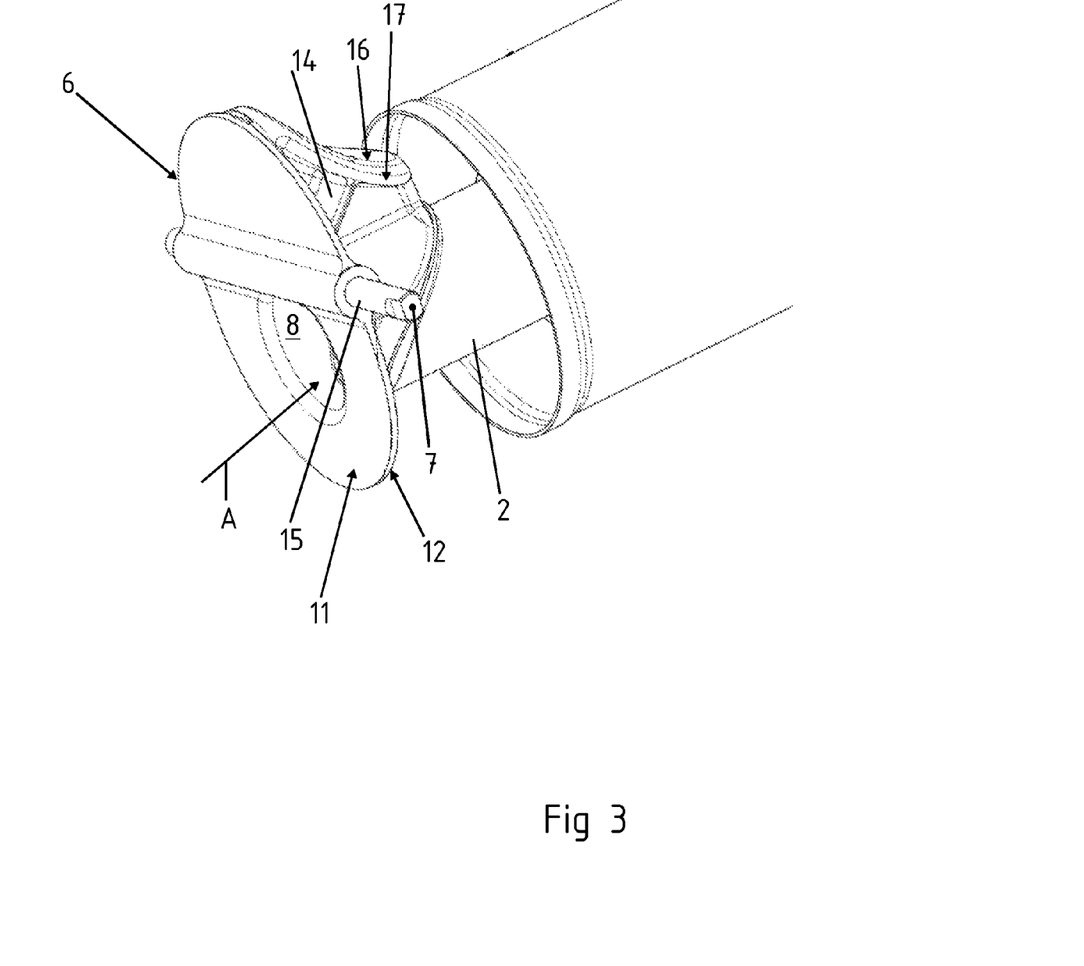
Figure 4:
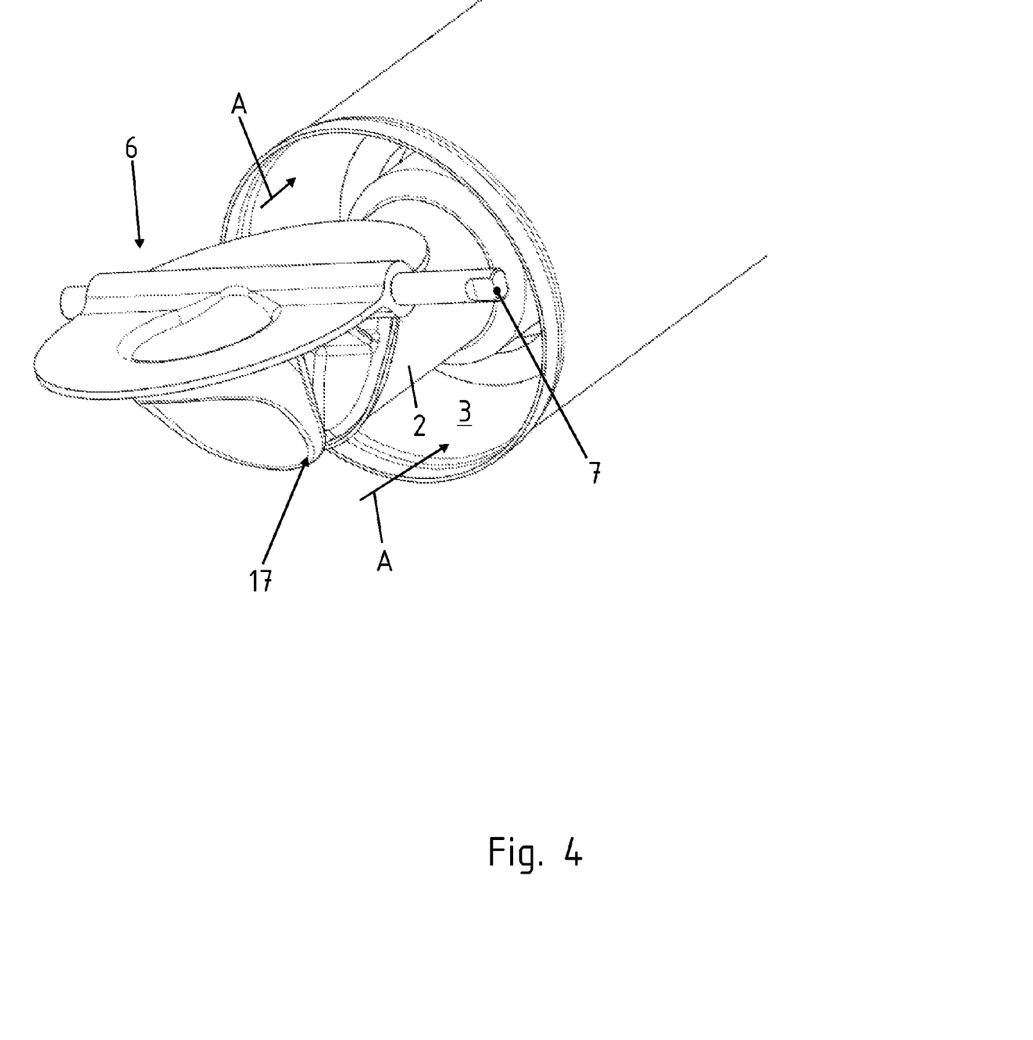

FIGS. 3 and 4 each show a perspective view of the exhaust-gas heat exchanger 1 according to the invention in the inlet region, without the housing. Here, in FIG. 3, the bypass flap is in a bypass position, such that the exhaust gas A can flow directly into the bypass pipe 2. It is possible here to clearly see the encircling disk body 11 and a corresponding external mounting of the rotary spindle 7. Here, a socket pin 15 is illustrated, about which the control flap 6 is designed to be rotatable. The opening 8 itself is in this case only partially broached by the rotary spindle 7 or the socket pin 15.

In FIG. 4, the control flap 6 has then been rotated about the rotary spindle 7, so as to be situated in the transfer position. Exhaust gas A can thus flow into the heat exchanger duct 3, wherein the bypass pipe 2 is closed by a sealing plate 16 arranged in the region of the cowl 14. A respectively encircling sealing bead 17 is preferably formed on the opening 8 and also on the sealing plate 16. The sealing bead 17 comes to bear particularly preferably in form-fitting fashion against the flared inlet 10 of the bypass pipe 2 in the respective bypass position or transfer position.

Figure 5:
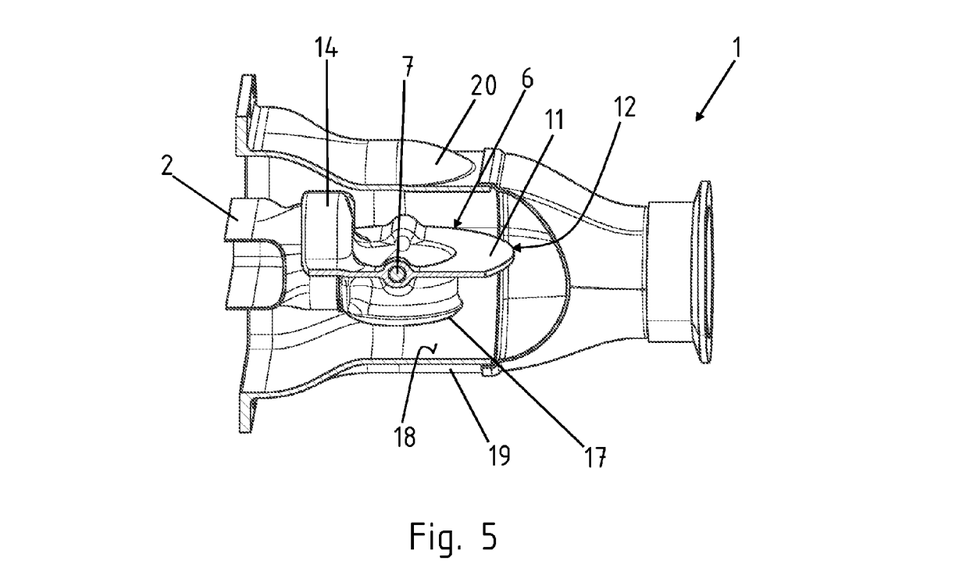
FIGS. 5 to 8 show a second design variant of the heat exchanger according to the invention, in different views.
Figure 6:
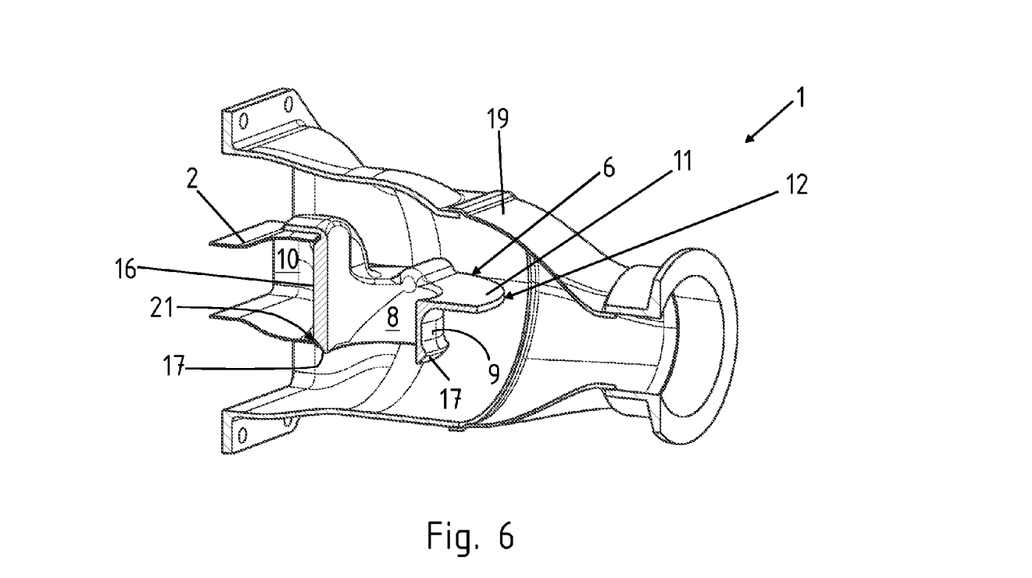
Figure 7:
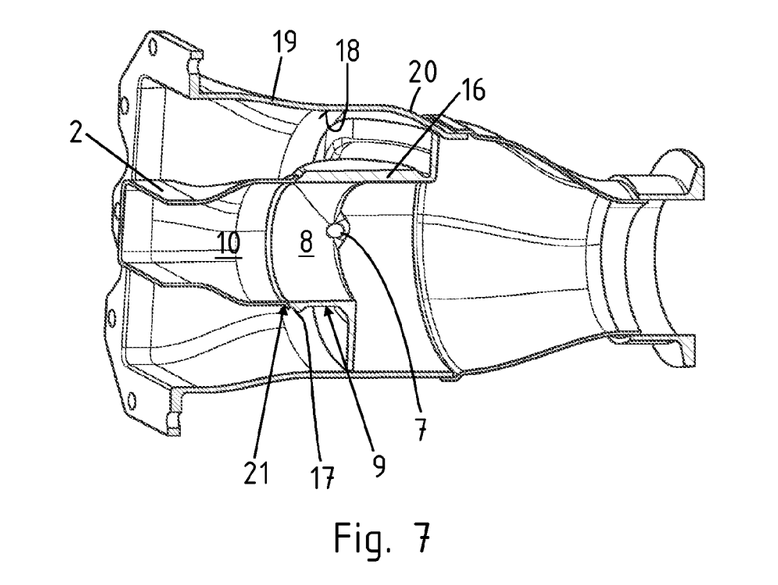
Figure 8:
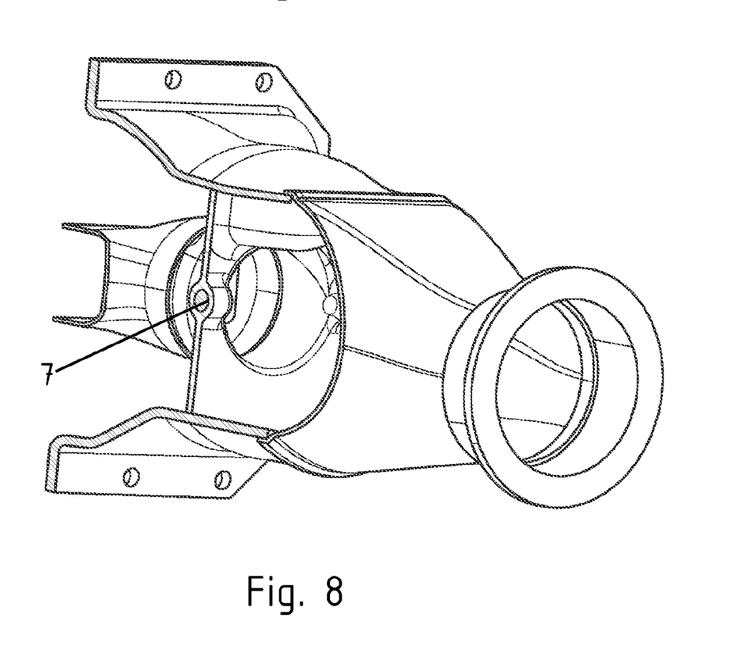

FIGS. 5 to 8 illustrate a further design variant of the exhaust-gas heat exchanger 1 according to the invention. Here, FIGS. 5 and 6 show the exhaust-gas heat exchanger 1 in the transfer position with the control flap 6 open. For this purpose, the control flap 6 has a disk body 11 running around the outside, which disk body in turn comes to bear sealingly, by way of its edge 12 running around the outside, against an inner shell surface 18 of the housing 19 in the bypass position as illustrated in FIG. 7. It is furthermore possible, in FIG. 5, to clearly see a bulge 20 on the outer housing 19, wherein, during a rotational movement about the rotary spindle 7, the cowl 14 that is illustrated here can be pivoted through said bulge without making abutting contact with the inner shell surface 18, which cowl then, in the bypass position as per FIG. 7, comes to bear sealingly in form-fitting fashion against the bulge 20 within the inner shell surface 18. The cowl 14 is in this case formed in the shape of a scoop.

Also illustrated is the sealing plate 16 on the outer side of the pipe stub-like section 9 of the opening 8. A sealing bead 17 is formed in an encircling manner on the sealing plate 16, and a sealing bead is likewise formed in an encircling manner on the opening 8. The respective sealing bead 17 of the sealing plate 16 comes to bear in form-fitting fashion against a flared portion 21 of the inlet 10 of the bypass pipe 2 in the transfer position illustrated in FIGS. 5 and 6, whereas, in FIGS. 7 and 8, the sealing bead 17 of the pipe stub-like section 9 comes to bear in form-fitting fashion against the flared portion 21 of the inlet 10 of the bypass pipe 2. It can likewise be clearly seen that, in the design variant illustrated here, the rotary spindle 7 lies in the opening 8. In this way, very compact dimensions are attained owing to the rotational movement of the control flap 6 that can be performed.

REFERENCE SIGNS

1—Exhaust-gas heat exchanger
2—Bypass pipe
3—Heat exchanger duct
4—Spiral pipe
5—Inlet region of 1
6—Control flap
7—Rotary spindle
8—Opening of 6
9—Pipe stub-like section
10—Inlet of 2
11—Disk body
12—Edge
13—Inner side of 5
14—Cowl
15—Socket pin
16—Sealing plate
17—Sealing bead
18—Inner shell surface of 19
19—Housing
20—Bulge of 19
21—Flared portion
A—Exhaust gas

The invention claimed is:

1. An exhaust-gas heat exchanger for a motor vehicle, comprising:
an encircling heat exchanger duct having an inlet;
a bypass pipe having an inlet and disposed within said heat exchanger duct;
a control flap rotatably mounted to the heat exchanger from a bypass position to a transfer position, the control flap having a disk-shaped body forming an outer periphery thereof and an opening therethrough, and a pipe protruding portion extending from the opening and in contact with the bypass pipe inlet in the bypass position; and,
a cowl substantially corresponding to an external contour of the bypass pipe and partially engaging over the bypass pipe when the control flap is in a transfer position.

2. The exhaust-gas heat exchanger as claimed in claim 1, wherein the control flap is a cast component.

3. The exhaust-gas heat exchanger as claimed in claim 1, wherein a sealing plate is formed on outer surface of the pipe protruding portion, and wherein the sealing plate seals off the inlet of the bypass pipe in the transfer position.

4. The exhaust-gas heat exchanger as claimed in claim 1, wherein the bypass pipe is flared at the inlet, the pipe protruding portion or a sealing plate coming to bear sealingly, by way of an encircling sealing bead, against an inner shell surface of the flared portion.

5. The exhaust-gas heat exchanger as claimed in claim 1, wherein the control flap is mounted so as to be rotatable about a rotary spindle, wherein the rotary spindle extends through the opening.

6. The exhaust-gas heat exchanger as claimed in claim 1, wherein a bulge is provided on an external housing, the cowl being pivotable past an inner side of the bulge and, in the bypass position, coming to bear sealingly against an inner shell surface of the housing in the region of the bulge.

7. The exhaust-gas heat exchanger as claimed in claim 1, wherein the control flap is of one piece and materially integral form.

* * * * *